United States Patent [19]
Utzinger et al.

[11] 3,860,077
[45] Jan. 14, 1975

[54] ELECTRICAL BALANCE WITH TARING MEANS

[75] Inventors: Diethelm Utzinger, Zurich; Peter Kunz, Meilen, both of Switzerland

[73] Assignee: Mettler Instrumente AG, Greifensee, Switzerland

[22] Filed: Nov. 19, 1973

[21] Appl. No.: 417,397

[30] Foreign Application Priority Data
Mar. 6, 1973  Switzerland.......................... 3248/73

[52] U.S. Cl. ................................................ 177/165
[51] Int. Cl. ........................................... G01g 23/14
[58] Field of Search ............................. 177/165, 210

[56] References Cited
UNITED STATES PATENTS

| | | | |
|---|---|---|---|
| 3,073,398 | 1/1963 | Blodgett et al. | 177/165 X |
| 3,077,940 | 2/1963 | Blodgett et al. | 177/165 |
| 3,684,875 | 8/1972 | Smith et al. | 177/165 UX |
| 3,786,883 | 1/1974 | Kunz | 177/210 X |

*Primary Examiner*—George H. Miller, Jr.
*Attorney, Agent, or Firm*—Werner W. Kleeman

[57] ABSTRACT

An electrical balance comprising a taring means and a switch element which is actuable from externally of the balance and which is operable both to switch the balance on or off and also to initiate a taring operation.

12 Claims, 5 Drawing Figures

PATENTED JAN 14 1975  3,860,077

ELECTRICAL BALANCE WITH TARING MEANS

BACKGROUND OF THE INVENTION

The present invention broadly relates to the art of balance or weighing devices and, in particular, concerns a new and improved construction of electrical balance with taring means.

Electrical balances with taring means are already known to the art and such type balance with taring means has been described in greater detail, for instance, in Swiss Pat. No. 530,624. In the constructional embodiment disclosed therein, and in accordance with conventional practice, there are provided separate switches and operating elements associated therewith for connecting the balance to its main power supply and for initiating a taring operation respectively.

SUMMARY OF THE INVENTION

It is a primary object of the present invention to provide an improved construction of electrical balance with taring means which is simpler in design and easier to operate than state-of-the-art electrical balances.

Another and more specific object of the present invention aims at the provision of an electrical balance equipped with taring means and means actuatable from externally of the balance and operable both to switch the balance on and off and also to initiate a taring operation.

Now in order to implement these and still further objects of the invention, which will become more readily apparent as the description proceeds, the invention contemplates an electrical balance comprising a taring means and a switch which is actuatable from externally of the balance and which is operable both to switch the balance on or off and also to initiate a taring operation.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4b is a plan view of the switch means depicted in FIG. 4a.

DETAILED DESCRIPTION OF THE PREFERRED EMBODIMENTS

Figure 1:
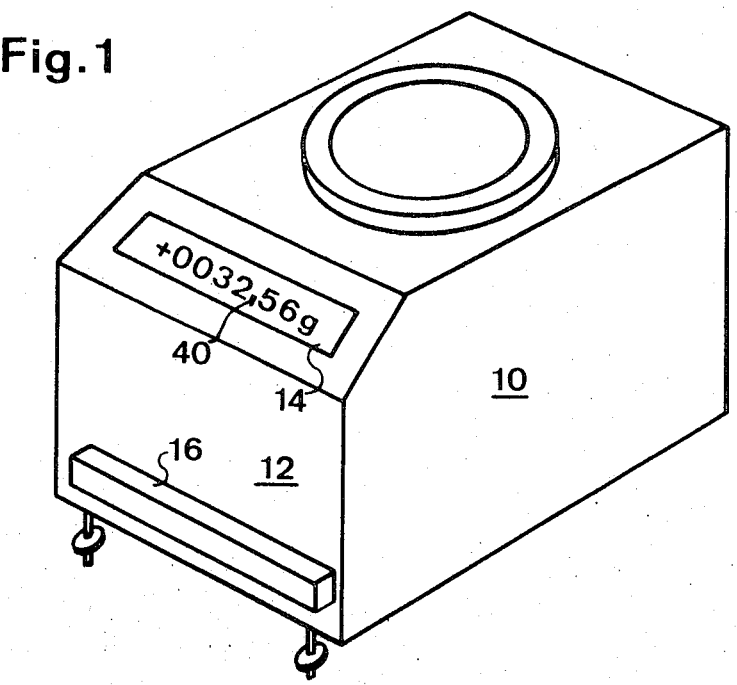
FIG. 1 illustrates a first exemplary embodiment of balance designed according to the invention.

Describing now the drawings, it is here firstly mentioned that only enough of the structure of the balance has been depicted therein to enable those skilled in the art to fully understand the underlying concepts of this development, and to generally otherwise preserve clarity in the illustration. Hence, referrring first to the embodiment of electrical balance depicted in FIGS. 1 and 2 it is to be understood that this balance has a housing 10, at the front 12 of which there are disposed an illuminated digit display 14 and an operating element or member, here shown in the form of an operating key 16. As best seen by referring to FIG. 2, the operating key 16 is fixedly connected through the agency of two pins 18 with a switch lever 20 which is pivotably mounted by a transversely extending pivot pin 22 or equivalent structure. Two identical springs 24 maintain the switch lever 20 in a central or neutral position, whereas two stationary stops or abutments 26 limit the operating travel of the switch lever 20.

Experience has shown that taring operations not only may be necessary at the beginning of a weighing operation, but frequently must also be repeated, for example during the course of weighing a plurality of components into a container. In view of the above requirement the arrangement of the springs 24 is advantageous, since the springs 24 cause the operating member to automatically assume a central position from which it is actuatable in one direction for cutting-in the balance and for triggering a taring operation, and in a second direction opposite to the first direction, for cutting-out the balance.

At its end remote from the operating key 16, the switch lever 20 has a switch element in the form of a lug or projection 28 which projects with clearance into a stirrup member or actuating bracket 30 for actuating a stationary slider switch 32. This switch 32 serves to switch the balance on or off by selectively connecting or disconnecting the entire electrical part 34 of the balance to or from a power supply source 36. In the embodiment as depicted the position shown corresponds to the ON-position.

As regards the general construction and the mode of operation of the balance, which are not essential for the understanding of the basic aspects of the present invention, reference is made, for instance, to the previously mentioned Swiss Pat. No. 530,624.

A switch in the form of a microswitch 38, and which is also stationarily arranged, is likewise actuatable by the lug or projection 28. This microswitch 38 acts as a tare switch and, whenever actuated, transmits the command "tare" to the corresponding part of the electrical control means of the balance to cause a taring operation to be performed in a manner conventional in this art.

Figure 2:
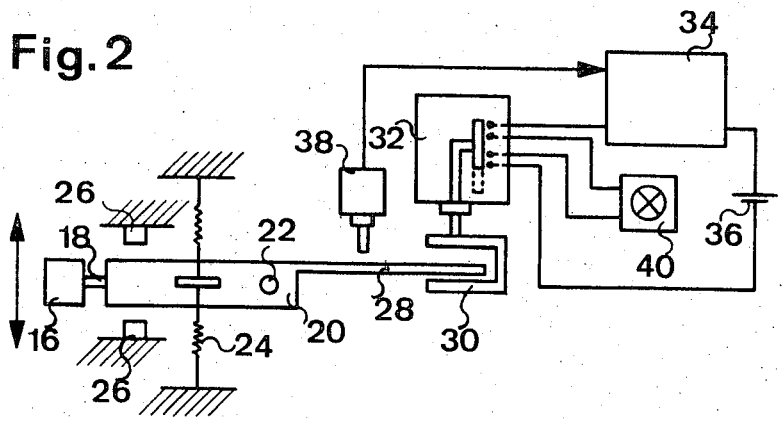
FIG. 2 illustrates details of the switch means of the balance depicted in FIG. 1.

Having now had the benefit of the description of the above-described arrangement its mode of operation will be considered and is as follows:

To switch-on the balance, the operating key 16 is briefly pressed downwards in FIGS. 1 and 2. This causes the switch 32 to be actuated to connect the balance to the power supply source 36 and at the same time causes a suitable monitoring or indicator lamp 40 to be lit and thus signal that the balance has been switched-on (in the present case the decimal point or comma of the digit display 14 conveniently operates as the control or indicator lamp 40), so that even in the absence of any indicating function, for instance during the warm-up time of the balance, there is an optical check. Secondly, a first taring operation is initiated by virtue of the lug or projection 28 simultaneously actuating the microswitch 38, with a result that the dead load of the balance can be eliminated or the balance zero point can be adjusted.

For further taring operations which might become necessary, whether at the beginning of a weighing operation with tare or for weighing a series of components into a single vessel, for each tare the operating key 16 is again briefly moved downwardly; the switch 32 is no longer affected by these further operations, but remains in the ON-position.

After the weighing activity has been completed, the operating key 16 is briefly pressed upwardly, thereby actuating the switch 32 to switch-off the balance by disconnecting it from the power supply source 36.

It will be recognized that the operating member in the form of the substantially horizontally extending operating key 16 possesses an elongate configuration and extends over substantially one entire dimension of the housing, here the width of the housing defined by the front or front portion 12 thereof, with the result that it is unnecessary for the operator to devote an undue amount of attention in actuating the operating key 16 since it is accessible over a rather large portion of the front 12 of the housing 10. This construction also is of advantage for lefthanded operators, since the horizontal elongate key can be operated equally well by the right or left hand.

Although in the exemplary embodiment illustrated by way of example the housing is that of the balance, it is to be understood that the operating key can be equally disposed on a control device associated with the actual balance assembly.

Figure 3:
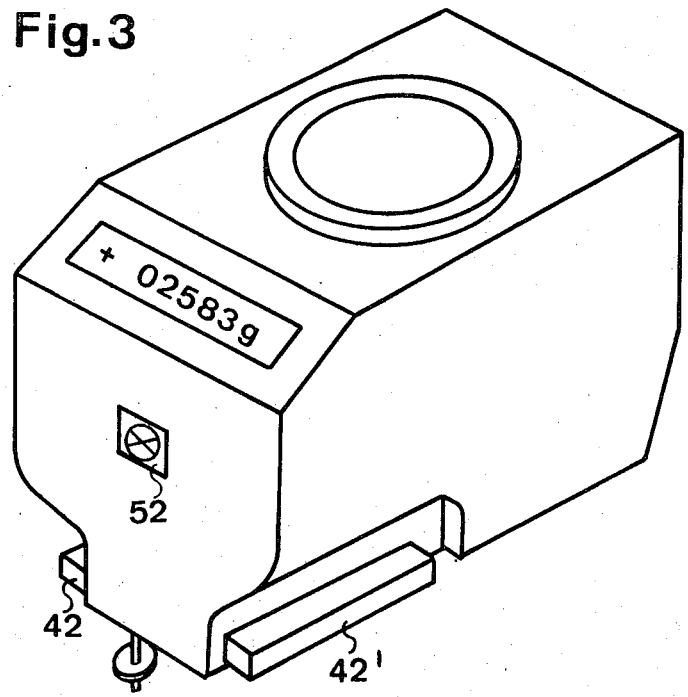
FIG. 3 illustrates a second embodiment of balance designed according to the teachings of the invention.
Figure 4A:
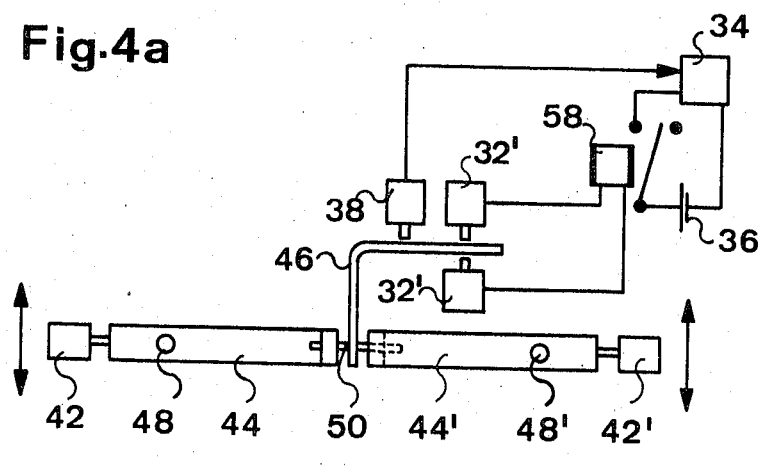
FIG. 4a is a side view of switch means employed in the second embodiment of balance depicted in FIG. 3.
Figure 4B:
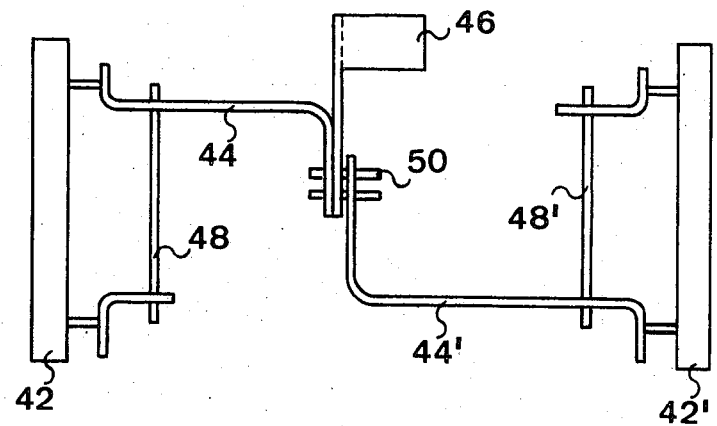

Continuing, and referring now to the second embodiment of electrical balance depicted in FIGS. 3, 4a and 4b, it is to be understood that this embodiment of balance is generally similar to the embodiment disclosed above in conjunction with FIGS. 1 and 2. However, instead of the single operating member in the form of the operating key 16, here the balance has two identical operating members in the form of the operating keys 42 and 42' which are equivalent in function. These operating keys 42 and 42' are arranged at two longitudinal sides of the balance housing and are connected through the intermediary of a respective switch operating lever 44 and 44' with a common switch element 46 which acts on tare and power supply source switches, in a manner to be described more fully hereinafter, in the same manner as in the embodiment of FIGS. 1 and 2. The two switch operating levers 44 and 44' are here also pivotably mounted at the respective transverse pivot pins 48 and 48' or equivalent structure and are connected at their connection location by means of two pins 50 which piercingly extend through the levers 44 and 44' with the necessary clearance.

With this arrangement, which can be of advantage for instance when the form of the balance does not permit a key to be mounted at the front of the balance, the individual switch commands can be selectively imparted either by means of the left-hand key or the right-hand key.

In this embodiment the digit display is without a point or comma. Thus, a separate control or indicator lamp 52 (FIG. 3) is provided to indicate the ON-condition of the balance.

A further difference from the above-described embodiment resides in the switch arrangement. Whereas in the first embodiment discussed above in conjuction with FIGS. 1 and 2 the power supply source 36 was cut-in or cut-out directly by means of the switch 32, in the second exemplary embodiment under consideration there are provided two microswitches 32' which control a relay 58. Thus, for each operation of one of the operating keys 42 and 42', the same uniform low manual switching force is required and may be applied for only a short period of time, whereas in the first embodiment a greater force was required for switching the balance on or off than for actuating a subsequent tare operation, since in the latter case only the microswitch 38 is actuated.

The above-described arrangements of the switch element and the operating member or members can be used on any balance, irrespective of the nature of the operating principle used in the balance and also the method of taring, provided that the balance is so designed that it can be switched on or off and taring triggered by one switching operation and do not require any further manipulations, as would be the case for instance for a taring operation performed by manually changing the degree of extension of a coil spring.

The above constructions in which the operating member or members is or are actuatable in a vertical direction takes into account the fact that the operator decision "upwardly - downwardly," regarding the movement of the operating member or members, from experience has been found to be easier and therefore quicker to carry out, than a decision "towards the right - towards the left," quite apart from the fact that vertical actuation corresponds to a natural or preferred direction of movement in the direction of the action of gravity.

While there is shown and described present prefered embodiments of the invention, it is to be distinctly understood that the invention is not limited thereto but may be otherwise variously embodied and practiced within the scope of the following claims.

Accordingly, what is claimed is:

1. An electrical balance equipped with a taring means, the improvement comprising a switch element actuatable from externally of the balance and which is operable both to switch the balance on or off and also to initiate a taring operation.

2. The balance as defined in claim 1, further including two functionally equivalent operating members for actuating said switch element.

3. The balance as defined in claim 1, further including means for optically indicating at least one of the possible switching conditions.

4. The balance as defined in claim 1, further including at least one microswitch operatively associated with said switch element.

5. The balance as defined in claim 1, further including microswitch means operatively associated with said switch element.

6. the balance as defined in claim 1, further including a single operating member for actuating the switch element.

7. The balance as defined in claim 6, wherein said operating member is a substantially horizontally disposed operating key.

8. The balance as defined in claim 6, wherein said operating member is mounted to be actuatable substantially in vertical direction.

9. An electrical balance equipped with a taring means, the improvement comprising a switch element actuatable from externally of the balance and which is operable both to switch the balance on or off and also to initiate a taring operation, a single operating member for actuating the switch element, a balance housing, said operating member possessing a substantially elongate configuration and extending along substantially the entire dimension of a wall of said balance housing.

10. The balance as defined in claim 9, wherein the balance housing includes a front, said operating member being arrranged at the front of said balance housing.

11. An electrical balance equipped with a taring means, the improvement comprising a switch element actuatable from externally of the balance and which is operable both to switch the balance on or off and also to initiate a taring operation, a single operating member for actuating the switch element, means for urging the operating member into a central position from which it is actuatable in one direction for switching the balance on and for initiating a taring operation and in a second direction opposite to the first direction for switching the balance off.

12. An electrical balance equipped with a taring means, the improvement comprising a switch element actuatable from externally of the balance and which is operable both to switch the balance on or off and also to initiate a taring operation, two functionally equivalent operating members for actuating said switch element, a balance housing having two longitudinally extending sides, each of said two operating members being arranged at one associated longitudinally extending side of the balance housing.

* * * * *